W. L. MAY.
TAPE-LINE LUMBER-MEASURE.

No. 184,537. Patented Nov. 21, 1876.

Witnesses.
A. Ruppert,
John Eils.

W. L. May
Inventor.
D. P. Holloway & Co.
Att'ys.

THE GRAPHIC CO. N.Y.

UNITED STATES PATENT OFFICE.

WILLIAM L. MAY, OF CHICAGO, ILLINOIS, ASSIGNOR OF ONE-HALF HIS RIGHT TO L. B. WADLEIGH, OF LYONS, IOWA.

IMPROVEMENT IN TAPE-LINE LUMBER-MEASURES.

Specification forming part of Letters Patent No. 184,537, dated November 21, 1876; application filed April 17, 1876.

*To all whom it may concern:*

Figure 1:
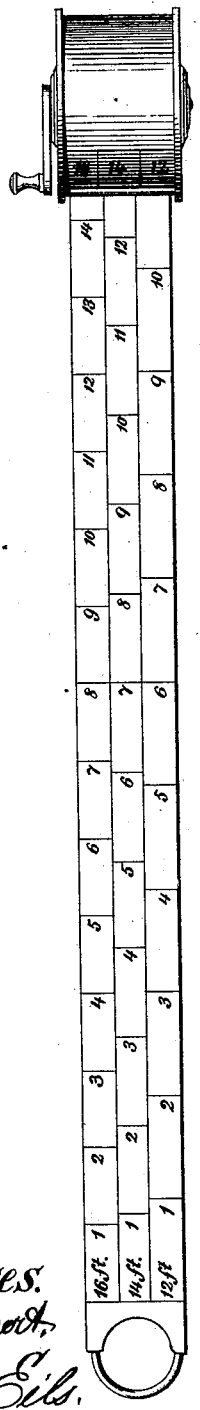
Figure 2:
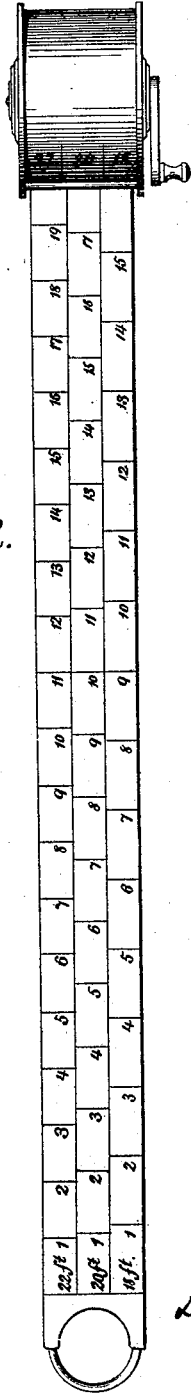

Be it known that I, W. L. MAY, of Chicago, in the county of Cook and State of Illinois, have invented a new and useful Improvement in Tape-Lines for Measuring Lumber, of which the following is a specification:

In the annexed drawings, which are made part of this specification, Figure 1 represents one side of the tape-line adapted for measuring boards of twelve, fourteen, and sixteen feet in length. Fig. 2 is the other side, graduated for measuring boards of eighteen, twenty, and twenty-two feet in length.

The graduation corresponds with that of the well-known "lumberman's rule." In measuring with the common rule each board is measured and the sum of its feet added to that of the next, either by setting each board down and adding the whole number together, or by carrying forward the sums formed by mental addition as each board is measured. Either method is liable to error.

In my tape-line the boards are successively measured across, commencing with each where the other left off, until all are measured, when the mark on the tape-line will indicate the total up to the amount the line is graduated to measure, say one thousand feet. It is manifest that there is very much less danger of making mistakes where the sum is made up of thousands of feet, or even of hundreds.

I have illustrated my invention as applied to the measurement of twelve, fourteen, sixteen, eighteen, twenty, and twenty-two feet boards, such being the sizes in common use; but it can be adapted as well for other sizes should the demands of the trade require it. There is nothing claimed as to the peculiar graduation.

The figures indicating the feet in length are marked on the first section next the ring; but it is manifest that if, in measuring, the line should be turned over, the measurement would be false if the eye followed the corresponding line on the other side. To avoid the danger of this the corresponding figures are distinctly marked on the case where each scale enters the opening in the case. As in measurements the line is drawn out of the case, these marks are continually under the observation of the operator, so that he can always correct himself in an instant without referring to the end of the line.

What I claim as my invention, and desire to secure by Letters Patent, is—

A tape-line for measuring lumber, having a series of columns to indicate aggregate quantities obtained by successive measurements, and having figures to indicate the lengths to which each column is intended to be applied marked on the shell opposite its proper column, substantially as set forth.

In testimony whereof I have signed my name to this specification in the presence of two subscribing witnesses.

W. L. MAY.

Witnesses:
W. W. STEVENS,
H. S. FARNSWORTH.